United States Patent Office 3,529,060
Patented Sept. 15, 1970

3,529,060
BETAMETHASONE 17-BENZOATE AND ITS USE
AS AN ANTI-INFLAMMATORY
Alberto Ercoli, Milan, and Rinaldo Gardi, Carate Brianza,
Milan, Italy, assignors to Warner-Lambert Pharmaceutical Company, Morris Plains, N.J., a corporation of
Delaware
No Drawing. Filed Feb. 26, 1968, Ser. No. 707,961
Claims priority, application Italy, Mar. 1, 1967,
13,231/67
Int. Cl. A61k 17/06; C07c 169/34
U.S. Cl. 424—243                                    5 Claims

ABSTRACT OF THE DISCLOSURE

There has been prepared the new 17α-benzoyloxy-9α-fluoro-16β-methyl-$\Delta^{1,4}$-pregnadiene-11β,21-diol - 3,20 - dione useful as antiinflammatory agent. It may be incorporated in a topically suitable pharmaceutical carrier to obtain pharmaceutical compositions which may be administered locally as ointments, creams or lotions, for the treatment of inflammatory conditions.

---

The present invention relates to a new 17-ester of 9α-fluoro-16β-methylprednisolone (betamethasone) having enhanced antiinflammatory activity. The invention also relates to pharmaceutical compositions containing this compound as well as to these compositions particularly adapted for the topical treatment of inflammatory conditions and diseases.

The new 17-ester of this invention is 17α-benzoyloxy-9α-fluoro - 16β - methyl-$\Delta^{1,4}$-pregnadiene-11β,21-diol-3,20-dione (betamethasone 17-benzoate).

Heretofore there were known certain 17-alkanoyl and cycloalkanoyl esters of 9α-halo-16β-methyl-prednisolone which compounds have been proposed for their high anti-inflammatory activity as suitable agents for the local treatment of inflammation. The prior art teaches that the presence of a 17-alkanoyl or cycloalkanoyl ester in a 9α-halo-16β-methyl prednisolone can confer on the parent steroid particular antiinflammatory properties on topical use, provided that said acyl radical contains no more than 6 carbon atoms.

Really the antiinflammatory activity of 17-alkanoyl esters of 9α-halo-16β-methyl prednisolone remains high in the members having from 3 to 5 carbon atoms (i.e. from 17-propionate to 17-valerate), but rapidly decreases with the increase of the number of the carbon atoms of the acyl chain, so that a 17-alkanoyl ester having 8 carbon atoms, i.e. the 17-caprylate, is practically inactive.

We have now found that betamethasone 17-benzoate, that is an aromatic ester containing 7 carbon atoms, not yet described in the literature, shows an unexpectedly high topical activity, as evidenced by bioassays especially designed for measuring the antiinflammatory action of a given substance of topical application (e.g. vasoconstriction test or antigranuloma assay). This activity is selective for the 17-benzoate since similar 17-esters having a six carbon atoms ring, either alicyclic or aromatic, such as 17-hexahydrobenzoate or 17-phenylacetate, show, by comparison, a very low antiinflammatory activity.

Betamethasone 17-benzoate shows in addition remarkable anti-edema properties when tested in comparison with the corresponding known 17-alkanoyl esters in the carrageenin induced raw paw edema assay.

The invention thus provides a potent anti-inflammatory steroid, particularly valuable for animal or human use.

The composition of this invention contains the active steroid in intimate admixture with a suitable carrier or excipient and may be in solid, semisolid, liquid or viscous form. The active ingredient may be compounded, for example, with the usual carriers for tablets, pellets, suppositories, powders, ointments, lotions, creams, emulsions, aqueous suspensions and other forms particularly suitable for topical use. The carriers employed are those which have already been proposed for use in manufacturing preparations for topical use, such as for example fats of animal origin and vegetable oils, saturated or unsaturated fatty acids, aluminum stearate, alcohols, polyalcohols, such as for example glycerol, propylene or polyethylene glycols, waxes, aliphatic hydrocarbons or lanolin, together with comparatively high quantities of water. Other carriers which can be used are hydrophilic bases, cholesterol, hydroxycholestrol, vaseline, vaseline oil, silicones which are physiologically inert, sodium alginate and in addition stabilizing, thickening and colouring agents and perfumes. The compositions of the present invention can also contain preservative or bacteriostatic agents such as for example esters of p-hydroxy benzoic acid, i.e. methyl-, ethyl- or propyl p-hydroxy benzoate, mercuric derivative, such as for example the merthiolate, or quaternary ammonium derivatives, such as for example cetyl trimethylammonium bromide, which besides the surface active action possess a good bacteriostatic activity.

Other active ingredients compatible with the new steroid of the invention, such as for example antibiotics, local anesthetics or sulphonamides can also be incorporated in the antiinflammatory compositions if these added properties or characteristics are desired.

Betamethasone 17-benzoate is included in the compositions of this invention in an amount sufficient to produce the desired therapeutic effect upon the inflammatory process or condition. Advantageously the compositions will contain the active ingredient in an amount of from 0.0005% to 5% by weight, and preferably contain the specific active ingredient in an amount of from 0.005% to 0.5% by weight.

The compositions of this invention are indicated for the treatment of dermatitides of various types, psoriasis and allergic conditions which respond to the topical application of antiinflammatory steroids.

The new 17-ester of this invention may be obtained by treating betamethasone with a lower alkyl orthobenzoate in the presence of an acid catalyst and hydrolysing by a dilute mineral or organic acid the resulting 17α,21-lower alkyl orthobenzoate according to the following scheme:

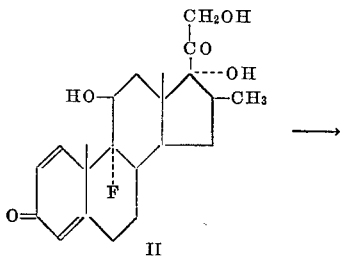

II

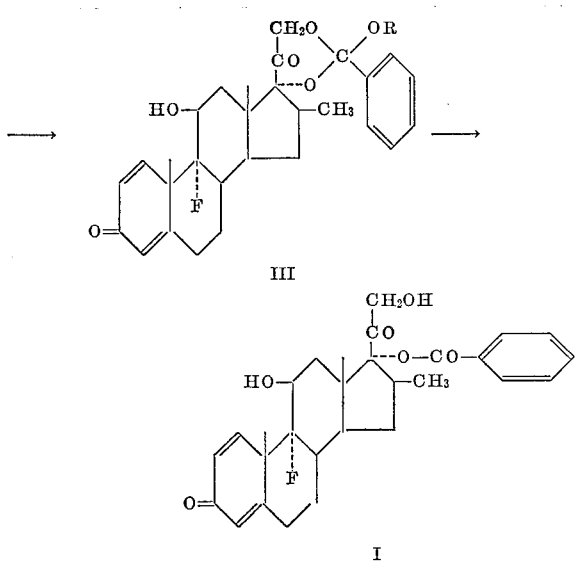

wherein R represents a lower alkyl, preferably methyl.

The orthoesterification step is carried out at a temperature ranging from 60° C. to 130° C. and preferably around 100° C.–110° C. for a period of 8–24 hours. The 17α,21-lower alkyl orthobenzoate of Formula III thus obtained is then hydrolysed to give the 17-monobenzoate I. The process can be carried out without isolating the intermediate orthobenzoate, which generally consists of a mixture of two isomers.

In order further to illustrate this invention the following examples are given.

EXAMPLE 1

A mixture of 50 g. of betamethasone, 50 cc. of dimethylformamide, 50 cc. of methyl orthobenzoate and 1.5 g. of p-toluenesulphonic acid is heated for 24 hours on oil bath at 105° C. while a slow stream of nitrogen is passed through the mixture and the methanol produced as a by-product of the reaction is distilled off. After addition of 2 cc. of pyridine to neutralize the acid catalyst the solvent and the excess of methyl orthobenzoate are almost completely eliminated under vacuum at moderate temperature. The residue is chromatographed on a column of 1500 g. of neutral aluminum oxide. By elution with ether-petroleum ether 30 g. of a crystalline mixture are obtained consisting of the epimeric mixture of 17α,21-methyl orthobenzoates. This mixture is dissolved without further purification, in 600 cc. of methanol and 240 cc. of aqueous 2 N oxalic acid are added to the solution. The reaction mixture is heated at 40–50° C. on water bath, then concentrated under vacuum. The residue, crystallized from acetone-ether, gives betamethasone 17-benzoate, M.P. 225–231° C., $[\alpha]_D^{22} = +62° \pm 2°$ (dioxane, c.=1%).

EXAMPLE 2

Ointment for external use having the following composition:

| Components: | Percent by weight |
|---|---|
| Betamethasone 17-benzoate | 0.10 |
| Beeswax | 5.00 |
| Anhydrous lanolin | 5.00 |
| White soft paraffin | 20.00 |
| Amphocerin K (Dehydag, Deutsche Hydrierwerke G.m.b.H., Düsseldorf) | 25.00 |
| Liquid paraffin | 14.90 |
| Distilled water | 30.00 |

Melt the beeswax, the lanolin, the white soft paraffin and the liquid paraffin at 70° C., add the active ingredient, then the mixture of the Amphocerin K and the water. Refine twice.

EXAMPLE 3

Ointment for external use having the following composition:

| Components: | Percent by weight |
|---|---|
| Betamethasone 17-benzoate | 0.05 |
| Cetyl alcohol | 0.50 |
| Anhydrous lanolin | 5.00 |
| Distilled water | 5.00 |
| Benzyl alcohol | 0.50 |
| Liquid paraffin | 20.00 |
| White soft paraffin | 68.95 |

Melt the cetyl and benzyl alcohols, the liquid paraffin and the white soft paraffin at 75° C., add the active ingredient, then the lanolin previously mixed with the water. Refine twice.

EXAMPLE 4

Hydrophilic ointment having the following composition:

| Components: | Percent by weight |
|---|---|
| Betamethasone 17-benzoate | 0.300 |
| Propylparaben | 0.015 |
| Methylparaben | 0.025 |
| Sodium laurylsulphate | 1.000 |
| Propylene glycol | 12.000 |
| Stearyl alcohol | 25.000 |
| White soft paraffin | 25.000 |
| Distilled water to 100%. | |

Melt the stearyl alcohol and the white soft paraffin on a steam bath, and warm to about 75° C., add a solution of the active ingredient in the propylene glycol, then the other ingredients previously dissolved in the water and warmed to 75° C. Stir the mixture until it congeals.

In the above hydrophilic ointment sodium laurylsulphate can be replaced by polyoxyl 40 stearate in an amount of 5% by weight.

EXAMPLE 5

Cream having the following composition:

| Components: | Percent by weight |
|---|---|
| Betamethasone 17-benzoate | 0.050 |
| Cetostearyl alcohol | 12.000 |
| White soft paraffin | 6.480 |
| Liquid paraffin | 6.480 |
| Isopropyl stearate | 3.240 |
| Propylene glycol | 3.240 |
| Methylparaben | 0.180 |
| Propylparaben | 0.050 |
| Tween 80 | 0.200 |
| Polyethylene glycol 6000 | 4.950 |
| Distilled water | 63.130 |

Melt the cetostearyl alcohol, the white soft paraffin, the liquid paraffin and the isopropyl stearate at about 70° C., add a solution of the active ingredient in the propylene glycol then the other ingredients, previously mixed with the water and warmed to 70° C. Refine twice.

EXAMPLE 6

Ointment having the following composition:

| Components: | Percent by weight |
|---|---|
| Betamethasone 17-benzoate | 0.3 |
| Pure cholesterol | 3.0 |
| Stearyl alcohol | 8.0 |
| White soft paraffin | 51.0 |
| Liquid paraffin | 37.7 |

Add the active product to the other ingredients previously melted at 75° C. and stir the mixture until it congeals.

EXAMPLE 7

Cream having the following composition:

| Components: | Percent by weight |
|---|---|
| Betamethasone 17-benzoate | 0.025 |
| Propylparaben | 0.015 |
| Methylparaben | 0.025 |
| Cetyl trimethylammonium bromide | 1.000 |
| Propylene glycol | 12.000 |
| Stearyl alcohol | 15.000 |
| White soft paraffin | 12.775 |
| Liquid paraffin | 22.500 |
| Distilled water | 36.660 |

Melt the stearyl alcohol, the white soft paraffin and the liquid paraffin at 75° C., add a solution of the active ingredient in the propylene glycol, then the other ingredients previously mixed with the water and warmed to 75° C. Refine twice.

EXAMPLE 8

Ointment having the following composition:

| Components: | Percent by weight |
|---|---|
| Betamethasone 17-benzoate | 0.20 |
| Lanolin | 14.45 |
| Liquid paraffin | 17.75 |
| Neomycin sulphate | 0.40 |
| White soft paraffin | 67.20 |

Add the betamethasone 17-benzoate and the neomycin sulphate to the other ingredients previously melted at 75° C. and refine twice.

In place or besides the neomycin sulphate other antibiotics can be used, such as colistin sulphate, bacitracin, chloramphenicol or the sulphonamides.

EXAMPLE 9

Ophthalmic ointment having the following composition:

| Components: | Percent by weight |
|---|---|
| Bentamethasone 17-benzoate | 0.025 |
| Liquid paraffin | 29.975 |
| White soft paraffin | 70.000 |

Add the active product to the other ingredients previously sterilized by heating at 120° C. for an hour. Refine twice and distribute into sterile tubes.

EXAMPLE 10

Lotion having the following composition:

| Components: | Percent by weight |
|---|---|
| Betamethasone 17-benzoate | 0.4 |
| Ethyl alcohol 95° | 40.0 |
| Water | 59.0 |
| Cologne water | 0.6 |

The active product is added to a clear mixture of the other ingredients.

EXAMPLE 11

Lotion having the following composition:

| Components: | Percent by weight |
|---|---|
| Betamethasone 17-benzoate | 0.03 |
| Ethyl alcohol 95° | 50.00 |
| Propylene glycol | 20.00 |
| Distilled water | 29.97 |

Dissolved the active product in the alcohol and add the alcoholic solution to a clear mixture of the other ingredients.

EXAMPLE 12

Lotion having the following composition:

| Components: | Percent by weight |
|---|---|
| Betamethasone 17-benzoate | 0.05 |
| Ethyl alcohol 95° | 40.00 |
| Glycerol | 10.00 |
| Propylene glycol | 30.00 |
| Distilled water | 19.95 |

Prepared as described in Example 11.

EXAMPLE 13

Tablets having the following composition:

| | Mg. |
|---|---|
| Betamethasone 17-benzoate | 2.000 |
| Lactose spray dried | 97.500 |
| Calcium stearate | 0.500 |

Pass the lactose spray dried through a No. 60 B.S. mesh sieve. Dissolve the active ingredient in about 0.03 cc. of ethyl alcohol 95°. Add the clear solution to the sieved lactose, mix well and let the solvent evaporate at room temperature in the usual manner. Add the calcium stearate to the dried mass, mix again and compress into tablets on 6 mm. diameter bisected punches.

EXAMPLE 14

Tablets having the following composition:

| | Mg. |
|---|---|
| Betamethasone 17-benzoate | 0.2 |
| Lactose spray dried | 99.3 |
| Calcium stearate | 0.5 |

Prepared as in Example 13.

We claim:
1. $17\alpha$ - benzoyloxy - $9\alpha$ - fluoro - $16\beta$ - methyl - $\Delta^{1,4}$-pregnadiene-$11\beta$,21-diol-3,20-dione.

2. A pharmaceutical composition for the local treatment of inflammation comprising as active ingredient the $17\alpha$ - benzoyloxy-$9\alpha$-fluoro-$16\beta$-methyl-$\Delta^{1,4}$-pregnadiene-$11\beta$,21-diol-3,20-dione in association with a topical pharmaceutical carrier.

3. A composition as claimed in claim 2, containing from 0.0005% to 5% by weight of the active ingredient.

4. A composition as claimed in claim 2, containing from 0.005% to 0.5% by weight of the active ingredient.

5. A method of treating inflammatory conditions which comprises topically applying to the area of the inflammation an effective amount of $17\alpha$-benzoyloxy-$9\alpha$-fluoro-$16\beta$-methyl-$\Delta^{1,4}$-pregnadiene-$11\beta$,21-diol - 3,20-dione incorporated in a topically suitable pharmaceutical carrier.

References Cited
UNITED STATES PATENTS

| 3,312,590 | 4/1967 | Elks et al. | 167—58 |
| 3,383,394 | 5/1968 | Weber et al. | 260—397.45 |

HENRY A. FRENCH, Primary Examiner

U.S. Cl. X.R.

260—397.45